Jan. 14, 1947.   J. A. POTTER   2,414,122
VOLTAGE REGULATION
Filed Nov. 10, 1944
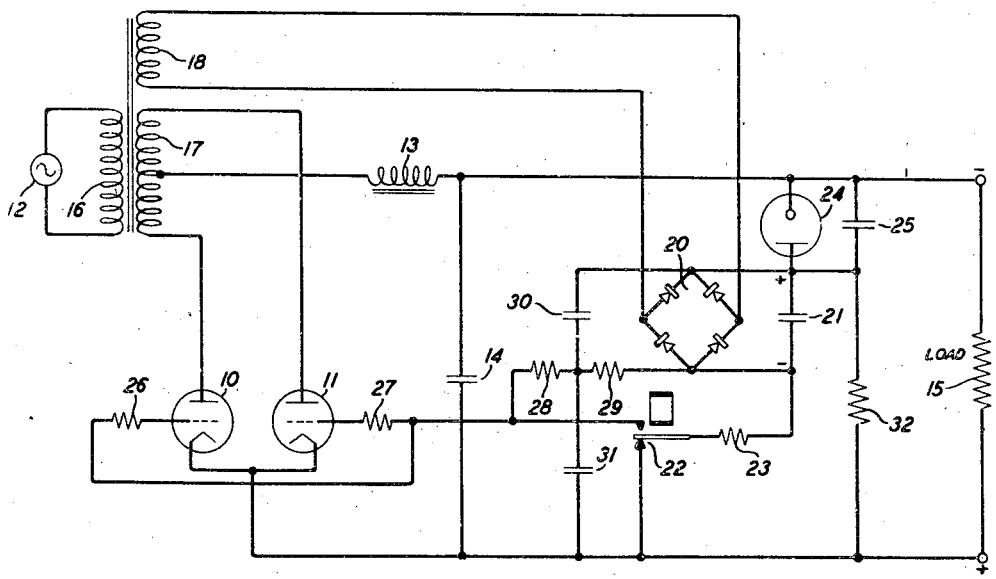
INVENTOR
J.A. POTTER
BY: G. F. Heuerman
ATTORNEY Patented Jan. 14, 1947

2,414,122

UNITED STATES PATENT OFFICE 2,414,122

VOLTAGE REGULATION

James A. Potter, Rutherford, N. J., assignor to Bell Telephone Laboratories, Incorporated, New York, N. Y., a corporation of New York Application November 10, 1944, Serial No. 562,770

4 Claims. (Cl. 175—363)

This invention relates to voltage regulation and particularly to apparatus for regulating the current supplied to a load from a direct current source to maintain the load voltage substantially constant.

An object of the invention is to provide improved regulated rectifying apparatus for supplying direct current to a load.

In accordance with the preferred embodiment of the invention herein shown and described for the purpose of illustration, there is provided a main rectifier comprising a space discharge rectifying device having an anode, a cathode and a control electrode for rectifying current from an alternating current supply line and for supplying the rectified current to a load. There is set up in a circuit connecting the control electrode and cathode of the space discharge device a unidirectional control voltage which varies over such a range in response to load or line voltage changes that the load voltage changes are greatly reduced. For setting up the control voltage there is connected across the load a current path comprising in series a constant voltage resistance means the resistance of which varies in response to current changes therethrough at such a rate that the voltage across said means remains substantially constant, an auxiliary rectifier for setting up a unidirectional voltage which varies in accordance with line voltage changes and a resistor across which the control voltage is set up, the auxiliary rectifier voltage being in aiding relationship with respect to the voltage of the main rectifier.

The invention will now be described with reference to the accompanying drawing the single figure of which is a diagrammatic view of a regulated rectifier constructed in accordance with the invention.

Referring to the drawing there is shown a main rectifier comprising space discharge devices 10 and 11, preferably of the gas filled type, for rectifying current from an alternating current supply source 12 and for supplying the rectified current through a ripple filter comprising series inductance element 13 and shunt condenser 14 to a load 15. There is provided a transformer having a primary winding 16 and secondary windings 17 and 18. The end terminals of winding 17 are connected to the anodes of rectifier tubes 10 and 11, respectively, and a mid-terminal of winding 17 is connected through inductance element 13 to the negative load terminal. The cathodes of tubes 10 and 11 are connected to the positive load terminal.

There is provided an auxiliary bridge rectifier 20 to which alternating current is supplied from source 12 through secondary transformer winding 18, a filtering condenser 21 being connected across the output terminals of the auxiliary rectifier. A relay or other suitable switching device 22, when its armature engages its lower contact as shown in the drawing, completes a shunt path across the load 15, said path comprising in series a resistor 23, rectifier 20 and a cold cathode, gaseous discharge device 24 having a condenser 25 connected across its terminals. The device 24 has the characteristic that its resistance changes in response to current changes therethrough at such a rate that the voltage drop across the tube remains substantially constant. Instead of using an electric discharge device of this type, there may be employed a resistance means comprising a so-called "thermistor" for producing a substantially constant voltage drop, such a resistance means disclosed in my United States Patent No. 2,356,269, granted August 22, 1944. When the armature of switch 22 engages its lower contact, a circuit is completed for impressing the voltage drop across resistor 23 upon the control grid-cathode path of rectifier tubes 10 and 11. This circuit may be traced from the control grid of tube 10 through resistor 26, and from the control grid of tube 11 through resistor 27, thence through resistors 28, 29 and 23 to the cathodes of tubes 10 and 11. A filtering condenser 30 connects the positive output terminal of auxiliary rectifier 20 to the common terminal of resistors 28 and 29 and a condenser 31 connects the common terminal of resistors 28 and 29 to the positive load terminal. When the armature of switch 22 engages its upper contact a circuit is completed for impressing the output voltage of auxiliary rectifier 20 upon the control grid-cathode path of tubes 10 and 11. This path may be traced from the negative output terminal of rectifier 20 through resistor 23, shunted by resistors 28 and 29 in series, and resistors 26 and 27, respectively, to the control grids, and from the positive terminal of auxiliary rectifier 20 through a resistor 32 to the cathodes of tubes 10 and 11.

The switch 22 may be operated by hand or by any suitable delay means such as that disclosed in application Serial No. 466,860 of J. A. Potter and D. E. Trucksess, filed November 25, 1942, now United States Patent No. 2,377,370, granted June 5, 1945. The switch is provided for the purpose of applying such a negative bias to the control electrodes of tubes 10 and 11, during the starting period when the cathodes of the tubes are being heated to operating temperature, that the flow of space current through the tubes and the resulting damage to the cathodes is substantially prevented. During this starting period the switch armature engages its upper contact and the control grids are thus biased negatively with respect to the cathodes by the output voltage of auxiliary rectifier 20.

After the cathodes are heated, the armature of switch 22 engages its lower contact to complete a current path connected across the load 15, said path comprising in series the constant voltage tube 24, the output of auxiliary rectifier 20, and resistor 23. There is thus completed a circuit which may be traced from the positive terminal of the main rectifier through resistor 23, auxiliary rectifier 20 and constant voltage tube 24 in series to the negative output terminal of the main rectifier, the output voltages of the main rectifier and of the auxiliary rectifier being in aiding relationship in the circuit. The sum of the load voltage and the output voltage of the auxiliary rectifier 20 is sufficiently high to cause the tube 24 to pass current which flows through the resistor 23. The positive terminal of resistor 23 is connected to the cathodes of tubes 10 and 11 and the negative terminal of the resistor is connected through resistors 29 and 28 and thence through resistor 26 to the control grid of tube 10 and through resistor 27 to the control grid of tube 11. The voltage drop across resistor 23 is sufficiently low to cause space current to flow through tubes 10 and 11.

If the supply line voltage 12 increases, for example, the output voltage of auxiliary rectifier 20 will increase. Since the voltage across voltage regulating tube 24 remains substantially constant irrespective of the resulting current rise in the circuit comprising resistor 23 and tube 24, the voltage drop across resistor 23 increases by an amount substantially equal to the increase of output voltage of the auxiliary rectifier. The control grids of rectifier tubes 10 and 11 thus become relatively more negative with respect to the cathodes to substantially prevent a rise of current through the load 15 and thus to maintain the load voltage substantially constant irrespective of the change of line voltage. If the load voltage rises by a small amount due to a decrease in load (increase of load resistance), for example, the voltage drop across resistor 23 rises, due to the increase of current flowing through the path comprising resistor 23, rectifier 20 and constant voltage tube 24, by an amount substantially equal to the rise of load voltage. As a result the control grids of tubes 10 and 11 become relatively more negative with respect to the cathodes to reduce the current supplied to the load. The rise of load voltage is thus minimized.

What is claimed is:

1. In combination, a main rectifier comprising a space current device having an anode, a cathode and a space current control element for rectifying current supplied thereto from an alternating current supply line and for supplying rectified current to a load, an auxiliary rectifier for rectifying current supplied thereto from said supply line to produce an output voltage which varies in response to line voltage changes, voltage stabilizing means the resistance of which changes in response to current changes therethrough at a rate to maintain substantially constant the voltage across said stabilizing means, a circuit connected in shunt to said load with respect to said main rectifier comprising in series, a resistor, said auxiliary rectifier and said voltage stabilizing means, the voltage of said main rectifier and said auxiliary rectifier output voltage being in aiding relationship in said circuit so that the voltage in said circuit is increased due to the presence of said auxiliary rectifier therein, one terminal of said resistor being connected to the positive load voltage terminal, and means for connecting the other terminal of said resistor to said space current control element for controlling the current supplied to said load from said main rectifier to maintain the load voltage substantially constant.

2. Means including a main rectifier connected to an alternating current supply source for supplying direct current to a load at substantially constant voltage comprising space discharge means having an anode, a cathode and a control electrode, auxiliary rectifying means connected to an alternating current supply source for producing an output voltage, voltage stabilizing means the resistance of which changes in response to current changes therethrough at a rate to maintain substantially constant the voltage across said stabilizing means, a current path connected in shunt to said load with respect to said main rectifier comprising in series a resistor, said auxiliary rectifying means and said voltage stabilizing means, the voltage of said main rectifier and the voltage of said auxiliary rectifying means in said path being in aiding relationship so that the voltage in a circuit comprising said voltage stabilizing means and said resistor is increased due to the presence therein of said auxiliary rectifying means, and means for impressing upon said control electrode with respect to said cathode a potential which varies in accordance with variations of the potential difference across said resistor.

3. A combination in accordance with claim 2 in which said last-mentioned means comprises means for connecting one terminal of said resistor to said cathode and the other terminal of said resistor to said control electrode.

4. In combination, a main rectifier for rectifying current supplied thereto from an alternating current supply line and for supplying the rectified current to a load, said rectifier comprising a space discharge device having an anode, a cathode and control electrode, the cathode of said discharge device being connected to the positive load voltage terminal, voltage stabilizing resistance means the resistance of which changes in response to change of current therethrough at such a rate that the voltage across said means remains substantially constant, an auxiliary rectifier for rectifying current supplied thereto from said alternating current supply line the output voltage of which varies in accordance with supply line voltage changes, a current path connected in shunt with said load comprising in series said voltage stabilizing means, said auxiliary rectifier output and a resistor, one terminal of said resistor being connected to the positive load voltage terminal, the main rectifier output voltage and the auxiliary rectifier output voltage being in aiding relationship in the circuit including said current path so that the voltage in said circuit is increased due to the presence of the auxiliary rectifier output voltage therein, and means for connecting the other terminal of said resistor to the control electrode of said discharge device, thereby controlling the current supplied by said main rectifier to said load.

JAMES A. POTTER.